(12) United States Patent
Ukumori et al.

(10) Patent No.: US 12,162,612 B2
(45) Date of Patent: Dec. 10, 2024

(54) ENERGY STORAGE SYSTEM (71) Applicant: GS Yuasa International Ltd., Kyoto (JP)

(72) Inventors: Nan Ukumori, Kyoto (JP); Daisuke Konishi, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 87 days.

(21) Appl. No.: 17/918,290

(22) PCT Filed: Apr. 6, 2021

(86) PCT No.: PCT/JP2021/014570
§ 371 (c)(1),
(2) Date: Oct. 11, 2022

(87) PCT Pub. No.: WO2021/210448
PCT Pub. Date: Oct. 21, 2021

(65) Prior Publication Data
US 2023/0150680 A1 May 18, 2023

(30) Foreign Application Priority Data
Apr. 16, 2020 (JP) .................................. 2020-073475

(51) Int. Cl.
| | |
|---|---|
| *H02J 7/00* | (2006.01) |
| *B64D 27/24* | (2024.01) |
| *B64U 50/31* | (2023.01) |
| *H01M 10/42* | (2006.01) |

(Continued)

(52) U.S. Cl.
CPC ............. *B64D 27/24* (2013.01); *B64U 50/31* (2023.01); *H01M 10/4264* (2013.01); *H01M 10/482* (2013.01); *H02J 7/0013* (2013.01); *H02J 7/0048* (2020.01); *H02J 7/005* (2020.01);

(Continued)

(58) Field of Classification Search
CPC ............... B64D 27/24; B64D 2221/00; H01M 10/4264; H01M 10/482; H01M 2220/20; H01M 10/486; H01M 10/615; H01M 10/44; H01M 10/48; H02J 7/0013; H02J 7/0048; H02J 7/005; H02J 7/0063; H02J 7/342;

(Continued)

(56) References Cited

U.S. PATENT DOCUMENTS

| | | | |
|---|---|---|---|
| 2007/0219670 A1* | 9/2007 | Tanaka ................ | H01M 10/613 700/295 |
| 2017/0305548 A1* | 10/2017 | Ozaki .................... | B64D 27/24 |

FOREIGN PATENT DOCUMENTS

| | | |
|---|---|---|
| EP | 3303124 B1 | 6/2020 |
| JP | 2012-161190 A | 8/2012 |
| JP | 2013-230024 A | 11/2013 |

(Continued)

OTHER PUBLICATIONS

International Search Report and Written Opinion for International Application No. PCT/JP2021/014570, dated Jun. 29, 2021, (11 pages), Japan Patent Office, Tokyo, Japan.

*Primary Examiner* — Lincoln D Donovan
*Assistant Examiner* — Alex W Lam
(74) *Attorney, Agent, or Firm* — Alston & Bird LLP (57) ABSTRACT

An energy storage system used in a flight vehicle includes: a plurality of energy storage apparatuses; and a power transfer circuit that is connected to the plurality of energy storage apparatuses and transfer electric power between the plurality of energy storage apparatuses.

10 Claims, 10 Drawing Sheets

(51) Int. Cl.
*H01M 10/48* (2006.01)
*H02J 7/34* (2006.01)

(52) U.S. Cl.
CPC ............ *H02J 7/0063* (2013.01); *H02J 7/342* (2020.01); *B64D 2221/00* (2013.01); *H02J 2207/20* (2020.01)

(58) Field of Classification Search
CPC . H02J 2207/20; H02J 7/34; H02J 7/00; B64U 50/31; B64U 50/30; Y02E 60/10
See application file for complete search history.

(56) References Cited

FOREIGN PATENT DOCUMENTS

| | | | |
|---|---|---|---|
| JP | 2015-198543 | A | 11/2015 |
| JP | 2016-088110 | A | 5/2016 |
| JP | 2016-222031 | A | 12/2016 |
| JP | 2017-108506 | A | 6/2017 |
| JP | 2017-109512 | A | 6/2017 |
| JP | 2018-020719 | A | 2/2018 |
| JP | 2018-057078 | A | 4/2018 |
| JP | 2019-054490 | A | 4/2019 |
| WO | WO-2017/207968 | A1 | 12/2017 |
| WO | WO-2019/058991 | A1 | 3/2019 |
| WO | WO-2019/232472 | A1 | 12/2019 |

\* cited by examiner

ENERGY STORAGE SYSTEM

CROSS REFERENCE TO RELATED APPLICATIONS

This application is a national stage application, filed under 35 U.S.C. § 371, of International Application No. PCT/JP2021/014570, filed Apr. 6, 2021, which claims priority to and the benefit of Japanese Application No. JP2020-073475, filed Apr. 16, 2020, the contents of both of which as are hereby incorporated by reference in their entireties.

BACKGROUND

Technical Field

The present invention relates to an energy storage system including a plurality of energy storage apparatuses.

Description of Related Art

Conventionally, an electric flight vehicle has been developed. For example, it is planned that a high-altitude platform station (HAPS) is implemented by mounting a wireless relay station on an electric flight vehicle. The flight vehicle used as the HAPS includes a solar cell and an energy storage apparatus, and is required to continue a non-landing flight for a long period of time such as half a year. The flight vehicle used as the HAPS flies using electric power generated by a solar cell and charges the energy storage apparatus in the daytime, and flies using the electric power charged in the energy storage apparatus at night. Patent Document JP-A-2019-54490 discloses a technique of configuring a communication network using the HAPS.

BRIEF SUMMARY

In the flight vehicle, when a defect such as failure, degradation, or power shortage is generated in the energy storage apparatus due to a usually unexpected cause, it is difficult to supply the electric power from the energy storage apparatus, and the operation is hindered. The energy storage apparatus is required to have high reliability so as not to interfere with the operation of the flight vehicle. It is conceivable that the flight vehicle includes a reserve energy storage apparatus in preparation for a case where the defect is generated in the energy storage apparatus. However, when the defect is not generated, the reserve energy storage apparatus becomes useless equipment. Furthermore, continuing an unused state in the charged state leads to the degradation of the energy storage apparatus.

An object of the present invention is to provide an energy storage system with improved reliability by equally using a plurality of energy storage apparatuses.

One aspect of the present invention is an energy storage system used in a flight vehicle, the energy storage system including: a plurality of energy storage apparatuses; and a power transfer circuit that is connected to the plurality of energy storage apparatuses and transfers electric power between the plurality of energy storage apparatuses.

With the above configuration, in the power storage system, even when the defect is generated in some of the energy storage apparatuses, the electric power is transferred from another energy storage apparatus, so that reliability of power supply is improved.

DETAILED DESCRIPTION OF VARIOUS EMBODIMENTS

An energy storage system used in a flight vehicle includes: a plurality of energy storage apparatuses; and a power transfer circuit that is connected to the plurality of energy storage apparatuses and transfer electric power between the plurality of energy storage apparatuses.

The energy storage system includes the plurality of energy storage apparatuses, and transfers the electric power between the plurality of energy storage apparatuses. Even when the electric power to be supplied to a load is insufficient in some energy storage apparatuses, the electric power is transferred from another energy storage apparatus. Even when a defect occurs in a part of the energy storage apparatuses, the electric power is transferred from another energy storage apparatus, and the power supply to the load is continued. Thus, utilization efficiency of the electric power in the entire energy storage system is improved, and reliability of the power supply is improved.

The plurality of energy storage apparatuses may include a first energy storage apparatus that does not supply the electric power to the load and a second energy storage apparatus that supplies the electric power to the load. The energy storage system can transfer the electric power from the first energy storage apparatus that does not supply the electric power to the load to the second energy storage apparatus that supplies the electric power to the load. The plurality of energy storage apparatuses including the spare first energy storage apparatus may be equally used. The reserve energy storage apparatus is effectively used, and the reserve energy storage apparatus does not continue the unused state.

The plurality of energy storage apparatuses may further include a third energy storage apparatus that supplies the electric power to a load different from the load to which the second energy storage apparatus supplies the electric power. When the plurality of energy storage apparatuses supplies the electric power to loads different from each other, performance of each energy storage apparatus can be appropriately designed according to each load, such as setting full charge capacity to a value according to the load.

The energy storage system may further include a control apparatus that controls the power transfer circuit based on the states of the plurality of energy storage apparatuses. The control apparatus controls the power transfer circuit based on the state of the energy storage apparatus such as the difference in battery temperature or presence or absence of the defect, whereby the electric power is transferred from another apparatus to the energy storage apparatus requiring the electric power to equally use the plurality of energy storage apparatuses.

The control apparatus may cause the power transfer circuit to transfer the electric power from the low-temperature energy storage apparatus to the high-temperature energy storage apparatus, thereby reducing power supply from the high-temperature energy storage apparatus to the load and increasing power supply from the low-temperature energy storage apparatus to the load. When the temperature of the energy storage apparatus is relatively high as the energy storage apparatus is filled with heat or the like, the control apparatus may perform control to reduce a burden rate on the load by the energy storage apparatus. That is, the control apparatus may control the power transfer circuit so as to reduce the power supply from the energy storage apparatus, which has a high temperature, to the load and so as to increase the power supply from the energy storage apparatus, which has a low temperature, to the load. Thus, the temperature of the energy storage apparatus having the high temperature can be reduced, and the energy storage apparatus can be prevented from being degraded relatively quickly.

The control apparatus may cause the power transfer circuit to transfer the electric power from the energy storage apparatus having a high discharge voltage to the energy storage apparatus having a low discharge voltage. Even when the discharge voltage of one energy storage apparatus decreases due to a cause such as a failure, the energy storage system can continue the power supply to the load by transferring the electric power from another energy storage apparatus.

The control apparatus may cause the power transfer circuit to transfer the electric power from the energy storage apparatus having a high state of charge to the energy storage apparatus having a low state of charge. Even when the state of charge of one energy storage apparatus decreases and even when the electric power to be supplied from one energy storage apparatus to the load is insufficient, the energy storage system can continue the power supply to the load by transferring the electric power from another energy storage apparatus.

The control apparatus may cause the power transfer circuit to transfer the electric power from the energy storage apparatus having a high state of health to an energy storage apparatus having a low state of health. When the energy storage apparatus is degraded, the state of health decreases. Even when one energy storage apparatus is degraded and even when the electric power to be supplied to the load is insufficient, the energy storage system can continue the power supply to the load by transferring the electric power from another energy storage apparatus.

The power transfer circuit may use a bidirectional DC-DC converter. The bidirectional DC-DC converter can transfer the electric power from one to the other or from the other to one. When the bidirectional DC-DC converter is used, the energy storage system can appropriately transfer the electric power from one energy storage apparatus to another energy storage apparatus as necessary.

Hereinafter, the present invention will be specifically described based on the drawings illustrating an embodiment.

EMBODIMENT

Figure 1:
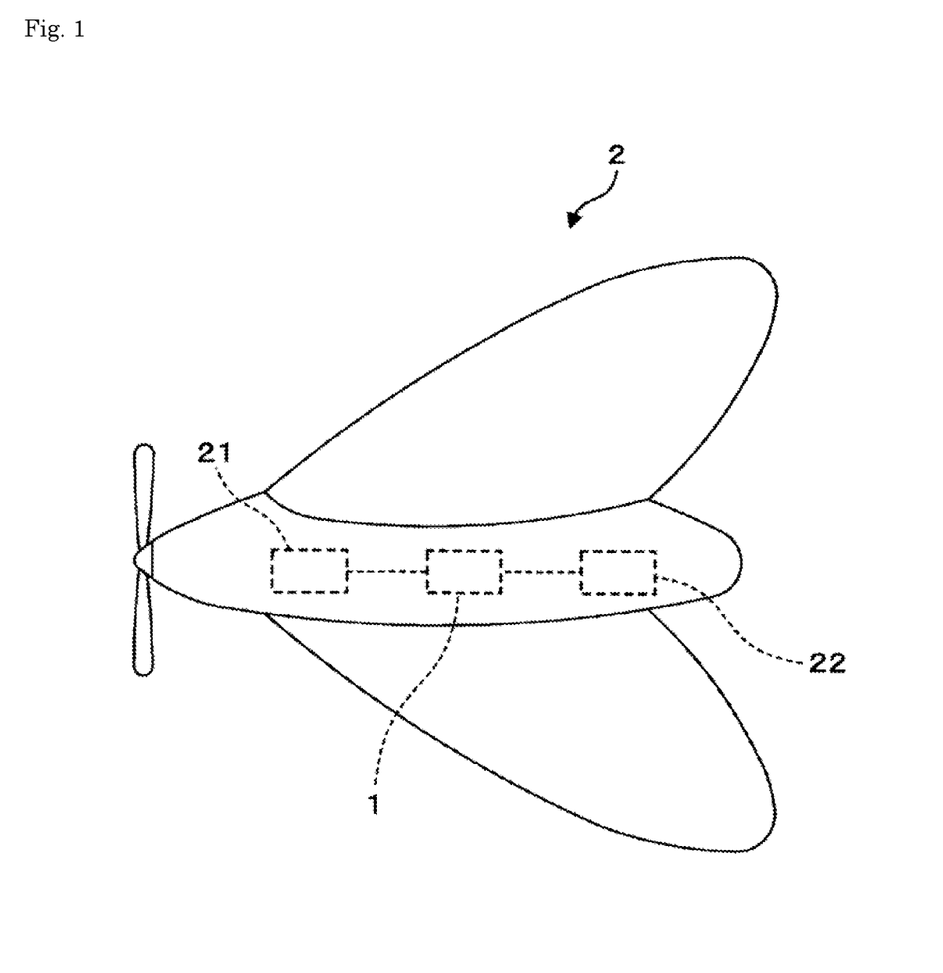
FIG. 1 is a schematic diagram illustrating a disposition example of an energy storage system.

FIG. 1 is a schematic diagram illustrating a disposition example of an energy storage system 1. The energy storage system 1 is provided in a flight vehicle 2. For example, the flight vehicle 2 is the HAPS. The flight vehicle 2 includes a load 21 such as a motor and a communication device, a solar cell 22, and the energy storage system 1. The load 21 and the solar cell 22 are connected to the energy storage system 1. The energy storage system 1 includes the plurality of energy storage apparatuses. The electric storage apparatus included in the energy storage system 1 is supplied with the electric power generated by the solar cell 22 and charged. The energy storage apparatus performs the discharge to supply the electric power to the load 21. The load 21 includes a motor that generates power in order to cause the flight vehicle 2 to fly, and the electric power generated by the solar cell 22 and the electric power discharged by the energy storage system 1 are supplied to the motor. The solar cell 22 and the energy storage system 1 may be connected in parallel to the load 21. For example, in the daytime, the electric power generated by the solar cell 22 is supplied to the energy storage system 1 and the load 21. At night, the electric power of the energy storage apparatus is supplied to the load 21.

Figure 2:
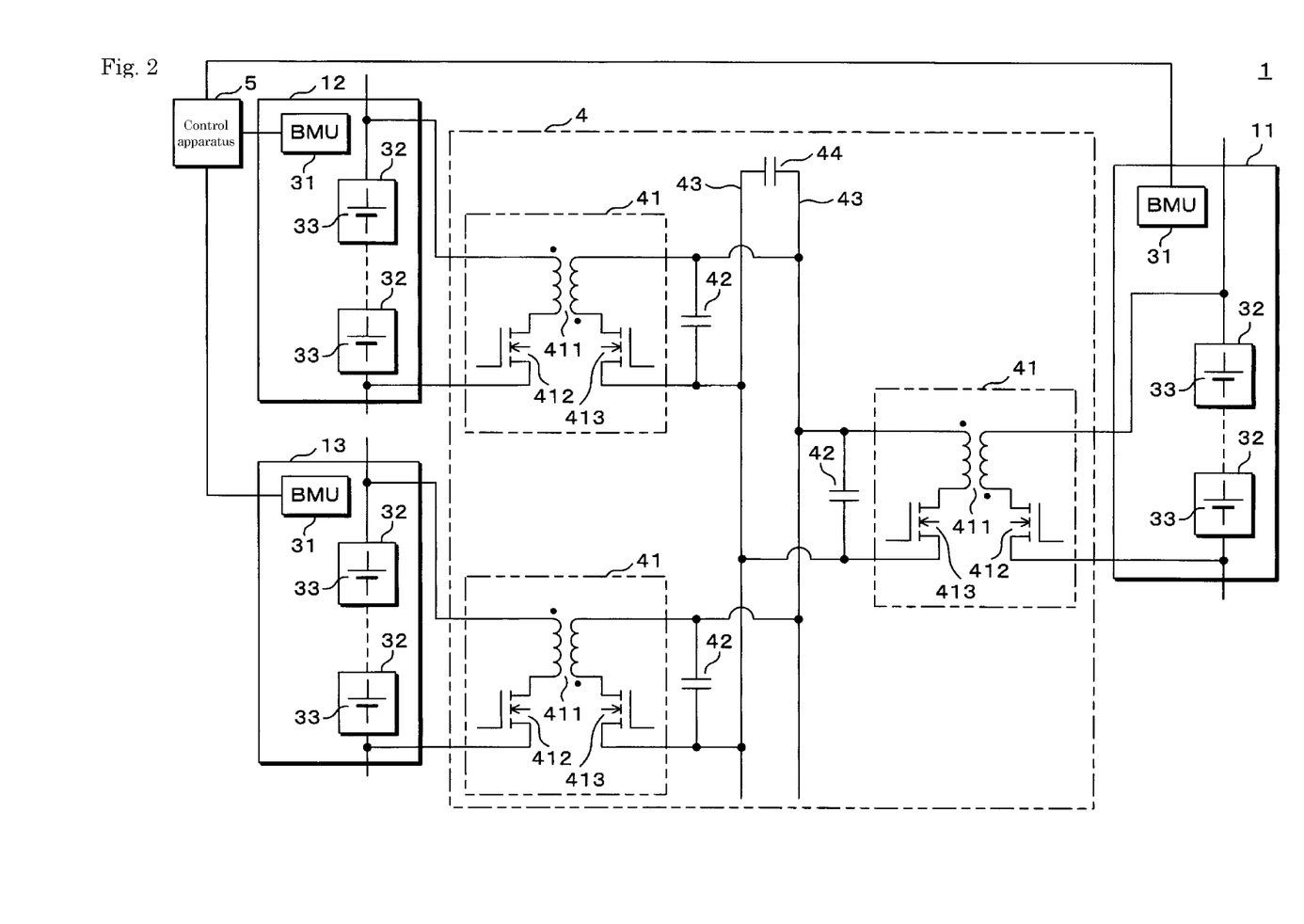
FIG. 2 is a block diagram illustrating a configuration example of the energy storage system.

FIG. 2 is a block diagram illustrating a configuration example of the energy storage system 1. The energy storage system 1 includes the plurality of energy storage apparatuses 11, 12, and 13. Each of the energy storage apparatuses 11, 12, and 13 includes a plurality of energy storage modules 32, and constitutes a bank in which the plurality of energy storage modules 32 are connected in series. The plurality of energy storage modules 32 may include the energy storage modules 32 connected in parallel. In each energy storage module 32, a plurality of energy storage cells 33 are connected in series. Although a single energy storage cell 33 is illustrated in the energy storage module 32 in FIG. 2, actually the energy storage module 32 includes the plurality of energy storage cells 33. The energy storage module 32 may include the energy storage cells 33 connected in parallel. Each of the energy storage cell 33 and the energy storage module 32 is an energy storage device that performs the charge and the discharge. For example, the energy storage cell 33 is a lithium ion battery.

Each of the energy storage apparatuses 11, 12, and 13 includes a battery management unit (BMU) 31. The BMU 31 measures states of the plurality of energy storage modules 32 included in the energy storage apparatus, and controls operations of the plurality of energy storage modules 32. The energy storage system 1 includes a control apparatus 5 that controls the energy storage apparatuses 11, 12, and 13. The BMU 31 included in each of the energy storage apparatuses 11, 12, and 13 is connected to the control apparatus 5.

Each of the energy storage apparatuses 11, 12, and 13 is connected to the solar cell 22, and supplied with electric power from the solar cell 22 to perform the charge. In the energy storage apparatuses 11, 12, and 13, the energy storage apparatus 11 is not connected to the load 21 by a power line, and does not supply the electric power to the load 21. The energy storage apparatus 11 functions as a spare energy storage apparatus that assists other energy storage apparatuses. The energy storage apparatus 11 corresponds to the first energy storage apparatus.

The energy storage apparatuses 12 and 13 are connected to the load 21 by the power line, perform the discharge, and supply the electric power to the load 21. In the plurality of loads included in the load 21, the energy storage apparatus 12 supplies the electric power to some loads, and the energy storage apparatus 13 supplies the electric power to a load different from the load to which the energy storage apparatus 12 supplies the electric power. For example, the energy storage apparatus 12 supplies the electric power to the motor, and the energy storage apparatus 13 supplies the electric power to the communication device. The energy storage apparatus 12 corresponds to the second energy storage apparatus, and the energy storage apparatus 13 corresponds to the third energy storage apparatus. When the plurality of energy storage apparatuses supplies the electric power to loads different from each other, performance of each energy storage apparatus can be appropriately designed according to each load, such as setting full charge capacity to a value according to the load.

The energy storage system 1 includes a power transfer circuit 4 that transfers the electric power between the plurality of energy storage apparatuses 11, 12, and 13. FIG. 2 includes an example of a circuit diagram of the power transfer circuit 4. The energy storage apparatuses 11, 12, and 13 are connected to each other through the power transfer circuit 4. The power transfer circuit 4 includes a pair of relay bus lines 43, and includes a plurality of bidirectional DC-DC converters 41 connected to the energy storage apparatuses 11, 12, and 13. The bidirectional DC-DC converter 41 has two pairs of power lines, one pair of power lines is connected to any one of the energy storage apparatuses 11, 12, and 13, and the other pair of power lines is connected to the pair of relay bus lines 43. A smoothing capacitor 42 is connected between the other pair of power lines. Each of the energy storage apparatuses 11, 12, and 13 is connected to the pair of relay bus lines 43 through the bidirectional DC-DC converter 41 and the smoothing capacitor 42. A buffer capacitor 44 is connected between the pair of relay bus lines 43.

The bidirectional DC-DC converter 41 includes a transformer 411 and switching elements 412 and 413. For example, the switching elements 412 and 413 are configured using a field effect transistor (FET). The transformer 411 and the switching element 412 are connected between one pair of power lines connected to any one of the energy storage apparatuses 11, 12, and 13. The transformer 411 and the switching element 413 are connected between the other pair of power lines connected to the pair of relay bus lines 43. Current flows between each of the energy storage apparatuses 11, 12, and 13 and the pair of relay bus lines 43 through the transformer 411, and the electric power is transferred. Depending on the operation of the switching elements 412 and 413, the bidirectional DC-DC converter 41 can transfer the electric power from one to the other and can also transfer the electric power from the other to one.

The smoothing capacitor 42 smooths a high-frequency component included in the current. The buffer capacitor 44 temporarily accumulates the electric power. The control apparatus 5 controls the power transfer circuit 4. The control apparatus 5 performs control to turn on or off the switching elements 412 and 413. The control apparatus 5 controls the switching elements 412 and 413 to cause the bidirectional DC-DC converter 41 to transfer the electric power from one to the other and from the other to one. The circuit configuration of the bidirectional DC-DC converter 41 in FIG. 2 is an example. The bidirectional DC-DC converter 41 may have another circuit configuration.

Figure 3:
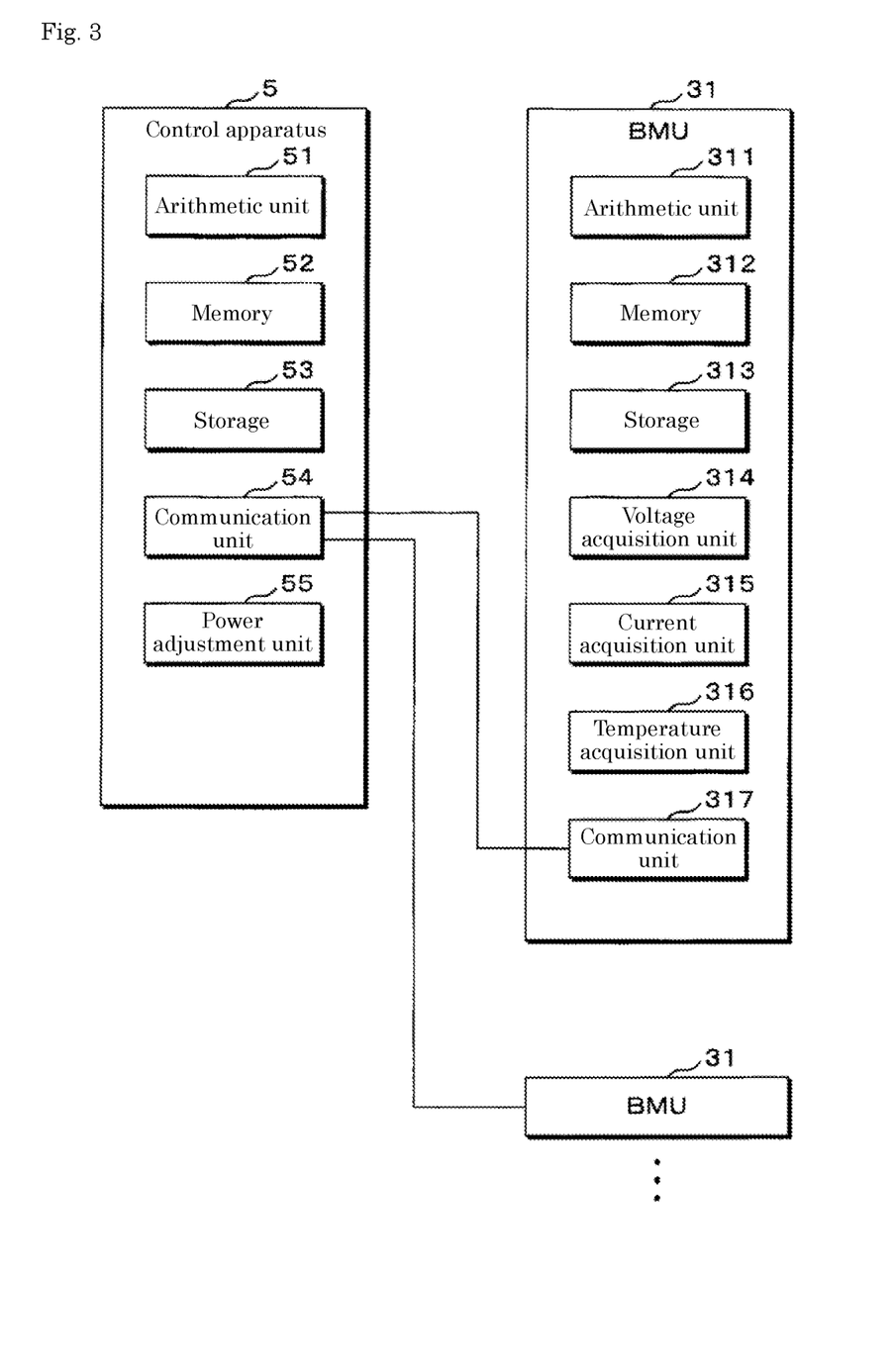
FIG. 3 is a block diagram illustrating a functional configuration example of insides of a control apparatus and a BMU.

FIG. 3 is a block diagram illustrating a functional configuration example of insides of the control apparatus 5 and the BMU 31. The BMU 31 measures the states of the plurality of energy storage modules 32 and controls the energy storage apparatuses 11, 12, or 13. The BMU 31 includes an arithmetic unit 311, a memory 312, a storage 313, a voltage acquisition unit 314, a current acquisition unit 315, a temperature acquisition unit 316, and a communication unit 317. For example, the arithmetic unit 311 is a central processing unit (CPU). The memory 312 stores information required for an arithmetic operation in the arithmetic unit 311. The storage 313 is nonvolatile and stores a program and data. For example, the storage 313 is a nonvolatile semiconductor memory. The arithmetic unit 311 executes processing according to the program stored in the storage 313.

The voltage acquisition unit 314 acquires the voltage of each of the plurality of energy storage modules 32, the voltage of each of the plurality of energy storage cells 33, or a discharge voltage of the energy storage apparatus 11, 12, or 13. The current acquisition unit 315 acquires the current flowing through the plurality of energy storage modules 32. For example, the current acquisition unit 315 acquires the current flowing through the plurality of energy storage modules 32 connected in series, or individually acquires the current flowing through respective energy storage modules 32. The temperature acquisition unit 316 acquires a temperature inside the energy storage apparatus 11, 12, or 13. For example, a temperature measuring element is provided in each of the energy storage apparatuses 11, 12, and 13 in order to measure a temperature such as a thermocouple, and the temperature acquisition unit 316 acquires the temperature using the temperature measuring element. The temperature acquisition unit 316 may acquire the temperature of each of the plurality of energy storage modules 32 or the temperature of each of the plurality of energy storage cells 33. The communication unit 317 is connected to the control apparatus 5. The communication unit 317 communicates with the control apparatus 5. The arithmetic unit 311 causes the communication unit 317 to transmit information indicating the acquired voltage and current to the control apparatus 5.

The control apparatus 5 includes an arithmetic unit 51, a memory 52, a storage 53, a communication unit 54, and a power adjustment unit 55. For example, the arithmetic unit 51 is a CPU. The memory 52 stores information necessary for an arithmetic operation in the arithmetic unit 51. The storage 53 is nonvolatile and stores a program and data. For example, the storage 53 is a hard disk. The arithmetic unit 51 executes processing according to the program stored in the storage 53. The communication unit 54 is connected to a plurality of BMUs 31. The communication unit 54 communicates with each BMU 31. The power adjustment unit 55 is connected to the plurality of bidirectional DC-DC converters 41. The power adjustment unit 55 controls the operation of the plurality of bidirectional DC-DC converters 41.

Figure 4:
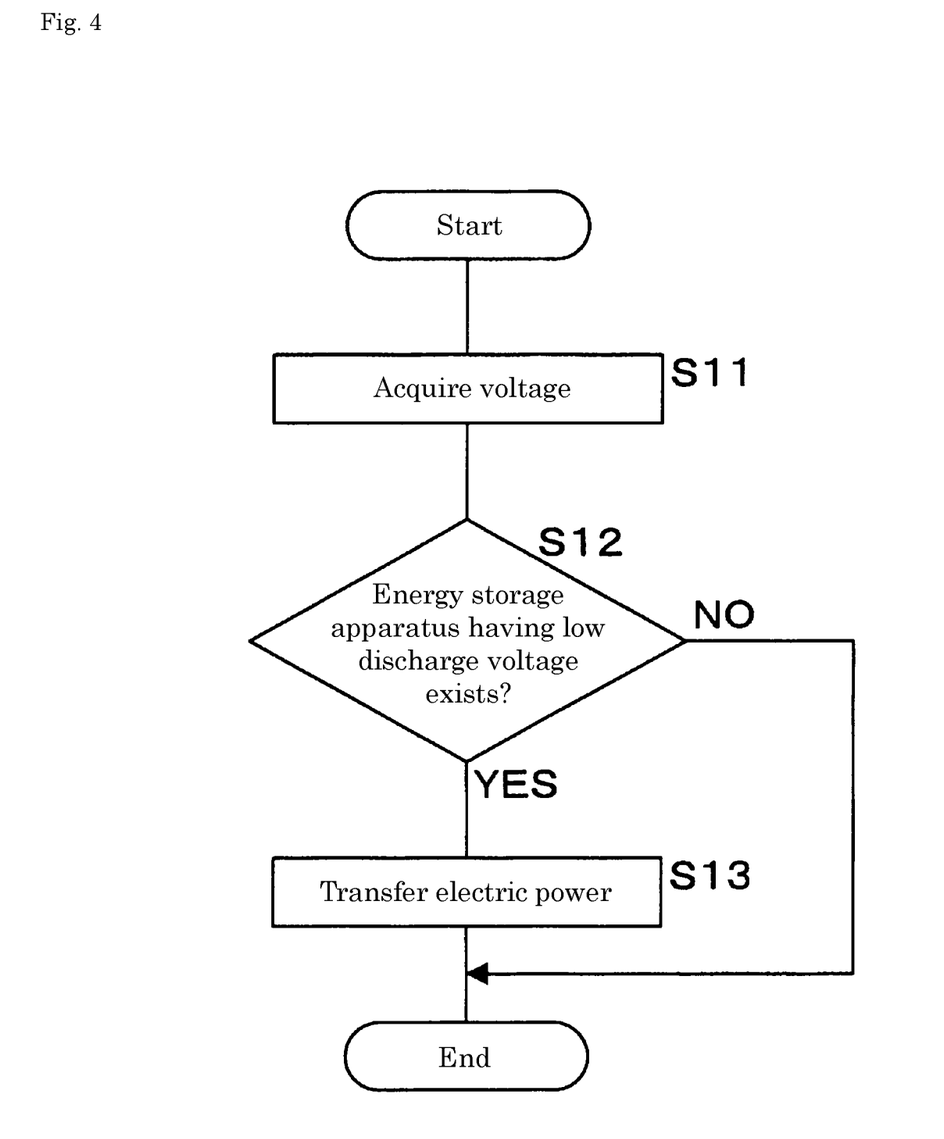
FIG. 4 is a flowchart illustrating a first example of a procedure of processing for transferring electric power between a plurality of energy storage apparatuses.

FIG. 4 is a flowchart illustrating a first example of a procedure of processing for transferring the electric power between the plurality of energy storage apparatuses. In each BMU 31, the voltage acquisition unit 314 acquires the voltage of each energy storage module 32, the voltage of each energy storage cell 33, or the discharge voltage of the energy storage apparatus 11, 12, or 13. The communication unit 317 transmits information indicating the acquired voltage to the control apparatus 5. The communication unit 54 receives the information indicating the voltages transmitted from the plurality of BMUs 31, so that the control apparatus 5 acquires the voltages of the energy storage apparatuses 11, 12, and 13 (S11).

The arithmetic unit 51 determines whether the energy storage apparatus having a low discharge voltage exists based on the acquired voltage (S12). When the discharge voltage of the energy storage apparatus is acquired, the arithmetic unit 51 determines that the energy storage apparatus having the low discharge voltage exists when the discharge voltage is less than or equal to a predetermined voltage. When the voltage of the energy storage module 32 or the voltage of the energy storage cell 33 is acquired, the arithmetic unit 51 specifies the discharge voltage of the energy storage apparatus based on the acquired voltage, and determines that the energy storage apparatus having the low discharge voltage exists when the specified discharge voltage is less than or equal to the predetermined voltage. The predetermined voltage is previously stored in the storage 53. Alternatively, the arithmetic unit 51 may determine that the energy storage apparatus having the low discharge voltage exists when the discharge voltage is less than the predetermined voltage. Alternatively, the arithmetic unit 51 may determine that the energy storage apparatus having the low discharge voltage exists when the difference between the discharge voltages of the plurality of energy storage apparatuses is larger than or equal to a predetermined threshold or exceeds the threshold.

When the energy storage apparatus having the low discharge voltage does not exist (NO in S12), the arithmetic unit 51 ends the processing. When the electric storage device having the low discharge voltage exists (YES in S12), the arithmetic unit 51 performs processing for transferring the electric power from the energy storage apparatus having the high discharge voltage to the energy storage apparatus having the low discharge voltage (S13). In S13, the arithmetic unit 51 causes the power adjustment unit 55 to operate the power transfer circuit 4 on order to transfer the electric power.

Figure 5:
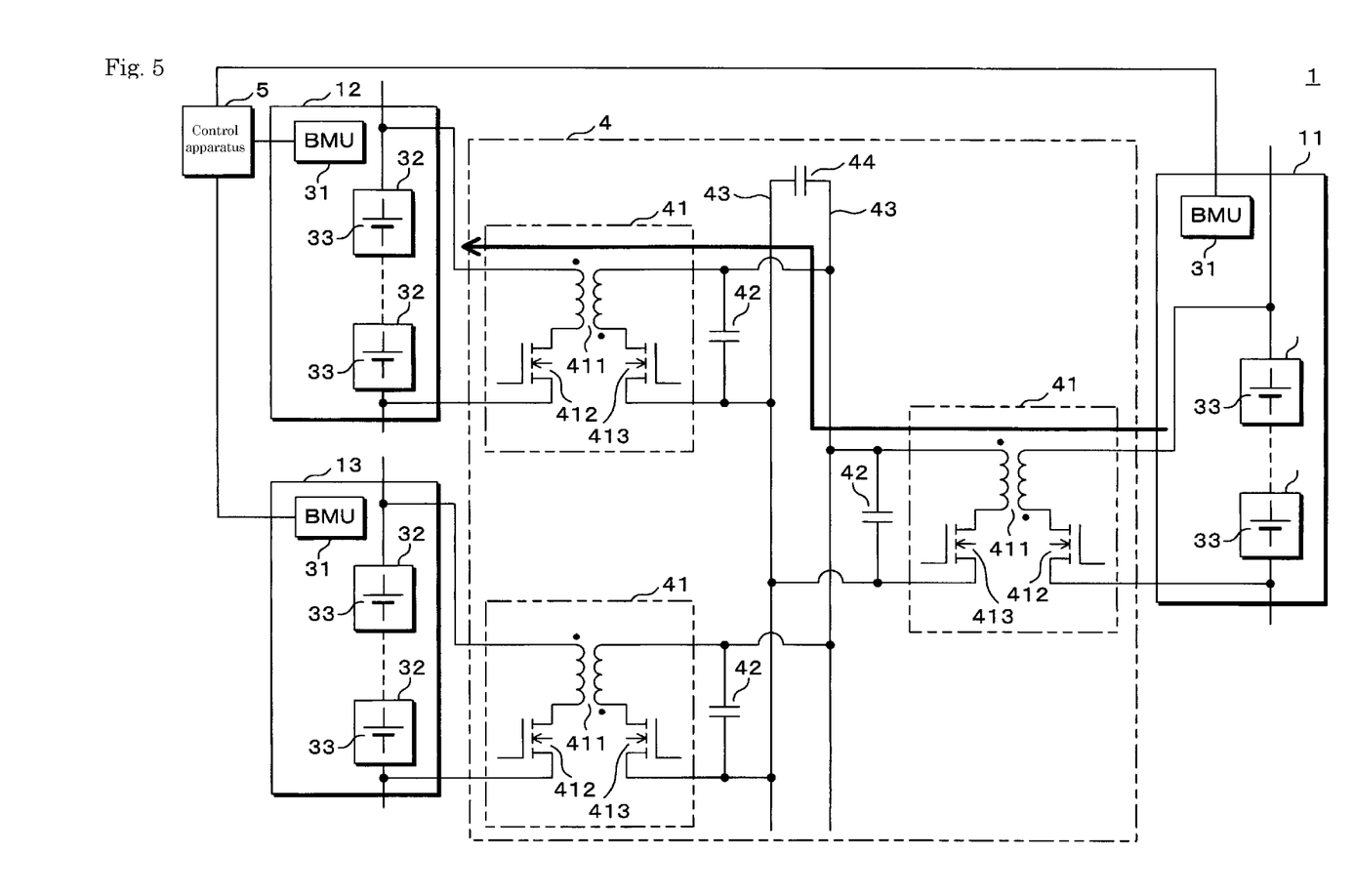
FIG. 5 is a block diagram illustrating a state in which the electric power is transferred from a reserve energy storage apparatus to another energy storage apparatus.

FIG. 5 is a block diagram illustrating the state in which the electric power is transferred from a reserve energy storage apparatus 11 to another energy storage apparatus 12. When an electric power demand on the load connected to the energy storage apparatus 12 is large, when the energy storage apparatus 12 fails, or the like, sometimes the discharge voltage of the energy storage apparatus 12 decreases. Because the energy storage apparatus 11 is not connected to the load, the discharge voltage tends to be stable. When the discharge voltage of the energy storage apparatus 11 is high and when the discharge voltage of the energy storage apparatus 12 decreases, the arithmetic unit 51 causes the power adjustment unit 55 to operate the power transfer circuit 4 so as to transfer the electric power from the energy storage apparatus 11 to the energy storage apparatus 12. The power adjustment unit 55 operates the bidirectional DC-DC converter 41 connected to the energy storage apparatus 11 by controlling the switching elements 412 and 413 in order to cause the current to flow from the energy storage apparatus 11 to the relay bus line 43. In addition, the power adjustment unit 55 operates the bidirectional DC-DC converter 41 connected to the energy storage apparatus 12 in order to cause the current to flow from the relay bus line 43 to the energy storage apparatus 12.

As indicated by a solid arrow in FIG. 5, the current flows from the energy storage apparatus 11 to the energy storage apparatus 12 through the power transfer circuit 4, and the electric power is transferred. The high-frequency component included in the current is smoothed by the smoothing capacitor 42, and a noise is prevented. The energy storage apparatus 12 is charged by the transferred electric power. Alternatively, the transferred electric power is supplied to the load connected to the energy storage apparatus 12. When the discharge voltage of the energy storage apparatus 13 is low, similarly the electric power is transferred from the energy storage apparatus 11 to the energy storage apparatus 13.

After S13 is ended, the control apparatus 5 ends the processing. Even when the discharge voltage of one energy storage apparatus decreases, the energy storage system 1 can continue the power supply to the load by transferring the electric power from another energy storage apparatus. For example, even when the power demand of the load temporarily increases or when one storage battery fails, the electric power is continuously supplied to the load.

Figure 6:
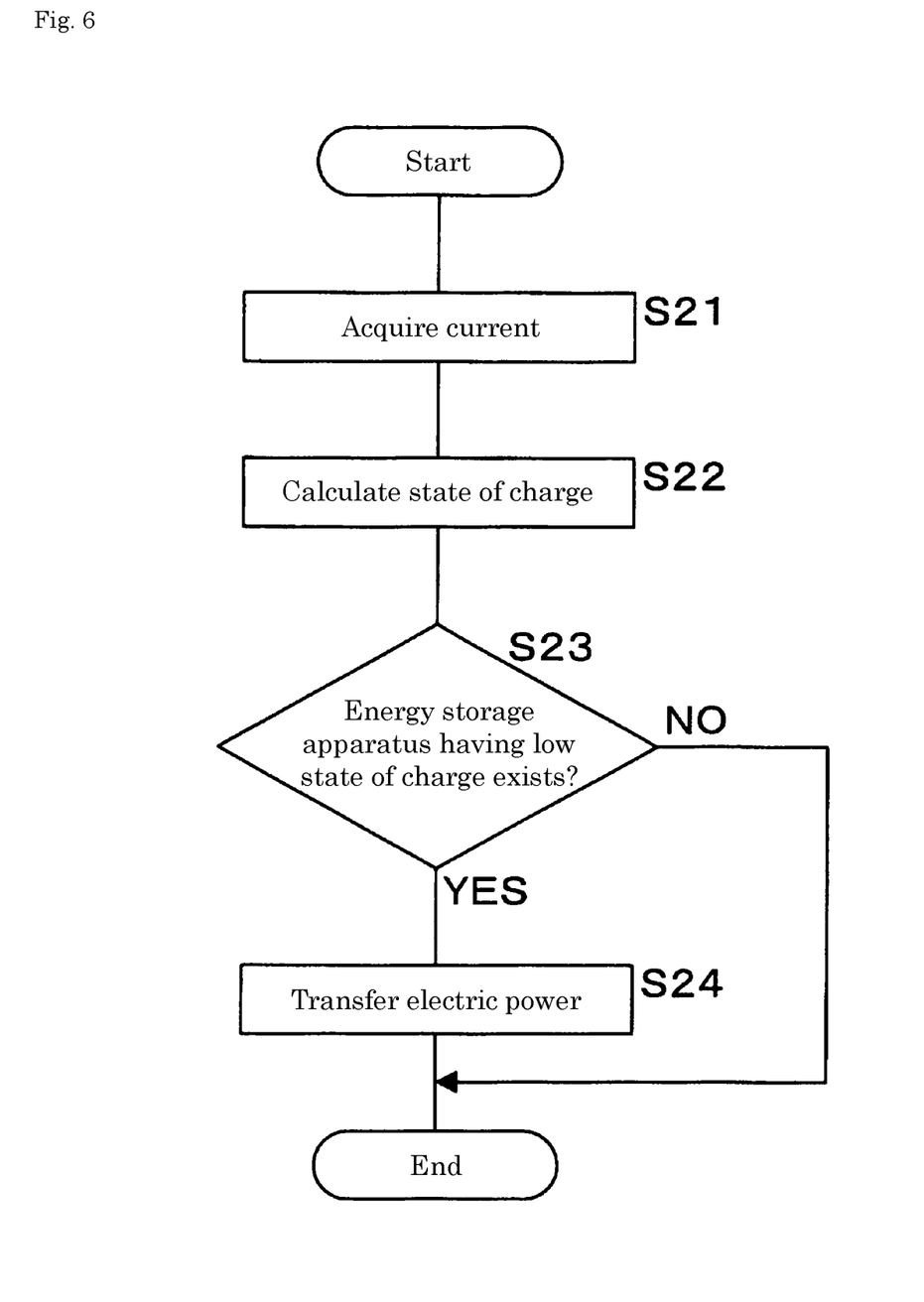
FIG. 6 is a flowchart illustrating a second example of the procedure of the processing for transferring the electric power between the plurality of energy storage apparatuses.

FIG. 6 is a flowchart illustrating a second example of the procedure of the processing for transferring the electric power between the plurality of energy storage apparatuses. In each BMU 31, the current acquisition unit 315 acquires the current flowing through the energy storage module 32, and the communication unit 317 transmits information indicating the acquired current to the control apparatus 5. The communication unit 54 receives the information indicating the currents transmitted from the plurality of BMUs 31, so that the control apparatus 5 acquires the current related to each of the energy storage apparatuses 11, 12, and 13 (S21).

The arithmetic unit 51 calculates a state of charge (SOC) of the energy storage apparatuses 11, 12, and 13 based on the acquired current (S22). In S22, for example, the arithmetic unit 51 calculates the SOC by integrating the values of the currents acquired so far. The arithmetic unit 51 may calculate the SOC by a method other than the method of integrating the current values. Alternatively, the energy storage system 1 may not perform the pieces of processing of S21 and S22, the BMU 31 may calculate the SOC of the energy storage apparatus based on the current acquired by the current acquisition unit 315 and transmit the calculated SOC to the control apparatus 5, and the control apparatus 5 may acquire the SOC.

Subsequently, the arithmetic unit 51 determines whether the energy storage apparatus having the low SOC exists (S23). In S23, the arithmetic unit 51 determines that the energy storage apparatus having the low SOC exists when the calculated SOC is less than or equal to a predetermined threshold. The threshold is stored in advance in the storage 53. Alternatively, the arithmetic unit 51 may determine that the energy storage apparatus having the low SOC exists when the SOC is less than the threshold. Alternatively, the arithmetic unit 51 may determine that the energy storage apparatus having the low SOC exists when a difference between the SOCs of the plurality of energy storage apparatuses is larger than or equal to a predetermined threshold or exceeds the threshold.

When the energy storage apparatus having the low SOC does not exist (NO in S23), the arithmetic unit 51 ends the processing. When the energy storage apparatus having the low SOC exists (YES in S23), the arithmetic unit 51 performs processing for transferring the electric power from the energy storage apparatus having the high SOC to the energy storage apparatus having the low SOC (S24). In S24, the arithmetic unit 51 causes the power adjustment unit 55 to operate the power transfer circuit 4 in order to transfer the electric power.

As a result of the energy storage apparatus 12 continuously supplying the electric power to the load, the SOC of the energy storage apparatus 12 may be significantly lowered. Because the energy storage apparatus 11 is not connected to the load, the SOC is hardly decreased. When the SOC of the energy storage apparatus 11 is high and when the SOC of the energy storage apparatus 12 decreases, the arithmetic unit 51 causes the power adjustment unit 55 to operate the power transfer circuit 4 so as to transfer the electric power from the energy storage apparatus 11 to the energy storage apparatus 12. As indicated by the solid arrow in FIG. 5, the electric power is transferred from the energy storage apparatus 11 to the energy storage apparatus 12 through the power transfer circuit 4. The energy storage apparatus 12 is charged by the transferred electric power. Alternatively, the transferred electric power is supplied to the load connected to the energy storage apparatus 12. When the SOC of the energy storage apparatus 13 is low, similarly the electric power is transferred from the energy storage apparatus 11 to the energy storage apparatus 13.

After S24 is ended, the control apparatus 5 ends the processing. Even when the SOC of one energy storage apparatus decreases, the energy storage system 1 can continue the power supply to the load by transferring the electric power from another energy storage apparatus. For example, even when the power to be supplied from one energy storage apparatus to the load is insufficient, the electric power is continuously supplied to the load using another energy storage apparatus.

Figure 7:
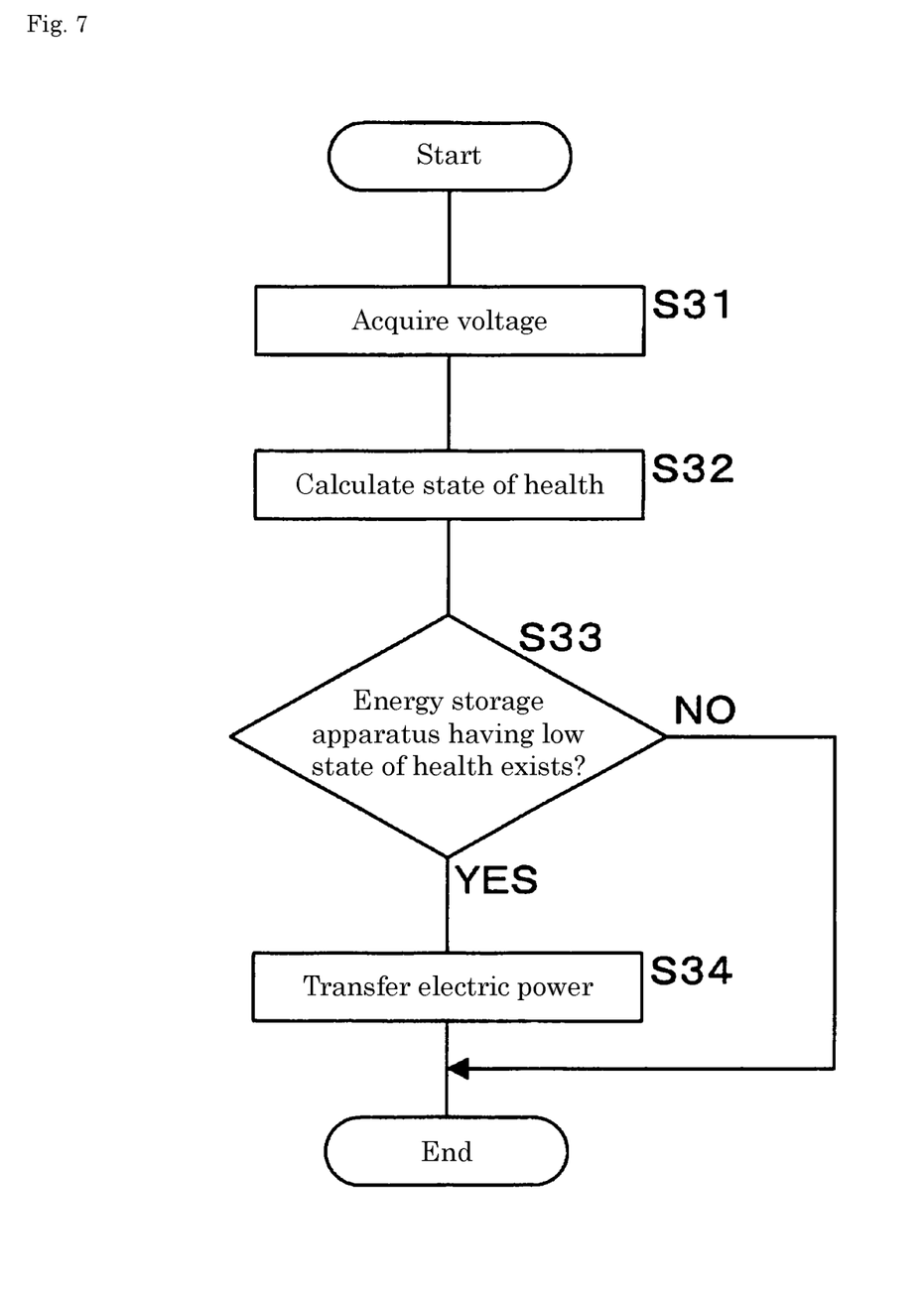
FIG. 7 is a flowchart illustrating a third example of the procedure of the processing for transferring the electric power between the plurality of energy storage apparatuses.

FIG. 7 is a flowchart illustrating a third example of the procedure of the processing for transferring the electric power between the plurality of energy storage apparatuses. In each BMU 31, the voltage acquisition unit 314 acquires the voltage related to the energy storage apparatus 11, 12, or 13, and the communication unit 317 transmits information indicating the acquired voltage to the control apparatus 5. When the communication unit 54 receives the information indicating the voltages transmitted from the plurality of BMUs 31, so that the control apparatus 5 acquires the voltages of the energy storage apparatuses 11, 12, and 13 (S31).

The arithmetic unit 51 calculates a state of health (SOH) indicating a ratio of an actual full charge capacity to an initial full charge capacity of the energy storage apparatuses 11, 12, and 13 based on the acquired voltage (S32). In S32, for example, the arithmetic unit 51 specifies the change in the voltage acquired so far according to a lapse of time, and calculates the SOH depending on the change in the voltage according to the relationship between the change in the voltage and the SOH stored previously in the storage 53. The arithmetic unit 51 may calculate the SOC by another method. Alternatively, the energy storage system 1 may not perform the pieces of processing of S31 and S32, the BMU 31 may calculate the SOH of the energy storage apparatus based on the voltage acquired by the voltage acquisition unit 314 and transmit the calculated SOH to the control apparatus 5, and the control apparatus 5 may acquire the SOH.

Subsequently, the arithmetic unit 51 determines whether the energy storage apparatus having the low SOH exists (S33). When the calculated SOH is less than or equal to a predetermined threshold, the arithmetic unit 51 determines that the energy storage apparatus having the low SOH exists. The threshold is stored in advance in the storage 53. Alternatively, the arithmetic unit 51 may determine that the energy storage apparatus having the low SOH exists when the SOH is less than the threshold. Alternatively, the arithmetic unit 51 may determine that the energy storage apparatus having the low SOH exists when a difference between the SOHs of the plurality of energy storage apparatuses is larger than or equal to a predetermined threshold or exceeds the threshold.

When the energy storage apparatus having the low SOH does not exist (NO in S33), the arithmetic unit 51 ends the processing. When the energy storage apparatus having the low SOH exists (YES in S33), the arithmetic unit 51 performs processing for transferring the electric power from the energy storage apparatus having the high SOH to the energy storage apparatus having the low SOH (S34). In S34, the arithmetic unit 51 causes the power adjustment unit 55 to operate the power transfer circuit 4 in order to transfer the electric power.

The energy storage apparatus having the low SOH is an energy storage apparatus in which the degradation has progressed. As a result of the repeated charge and discharge of the energy storage apparatus 12, sometimes the energy storage apparatus 12 may be degraded and the SOH is lowered. Because the energy storage apparatus 11 is not connected to the load, the degradation relatively hardly progresses. When the SOH of the energy storage apparatus 11 is high and when the SOH of the energy storage apparatus 12 decreases, the arithmetic unit 51 causes the power adjustment unit 55 to operate the power transfer circuit 4 so as to transfer the electric power from the energy storage apparatus 11 to the energy storage apparatus 12. As indicated by the solid arrow in FIG. 5, the electric power is transferred from the energy storage apparatus 11 to the energy storage apparatus 12 through the power transfer circuit 4. The transferred electric power is supplied to the load connected to the energy storage apparatus 12. The energy storage apparatus 12 may be charged by the transferred electric power. When the SOH of the energy storage apparatus 13 is low, similarly the electric power is transferred from the energy storage apparatus 11 to the energy storage apparatus 13.

After S34 is ended, the control apparatus 5 ends the processing. Even when the SOH of one energy storage apparatus decreases, the energy storage system 1 can continue the power supply to the load by transferring the electric power from another energy storage apparatus. For example, even when one energy storage apparatus is degraded and when the electric power to be supplied to the load is insufficient, the electric power is continuously supplied to the load using another energy storage apparatus.

Figure 8:
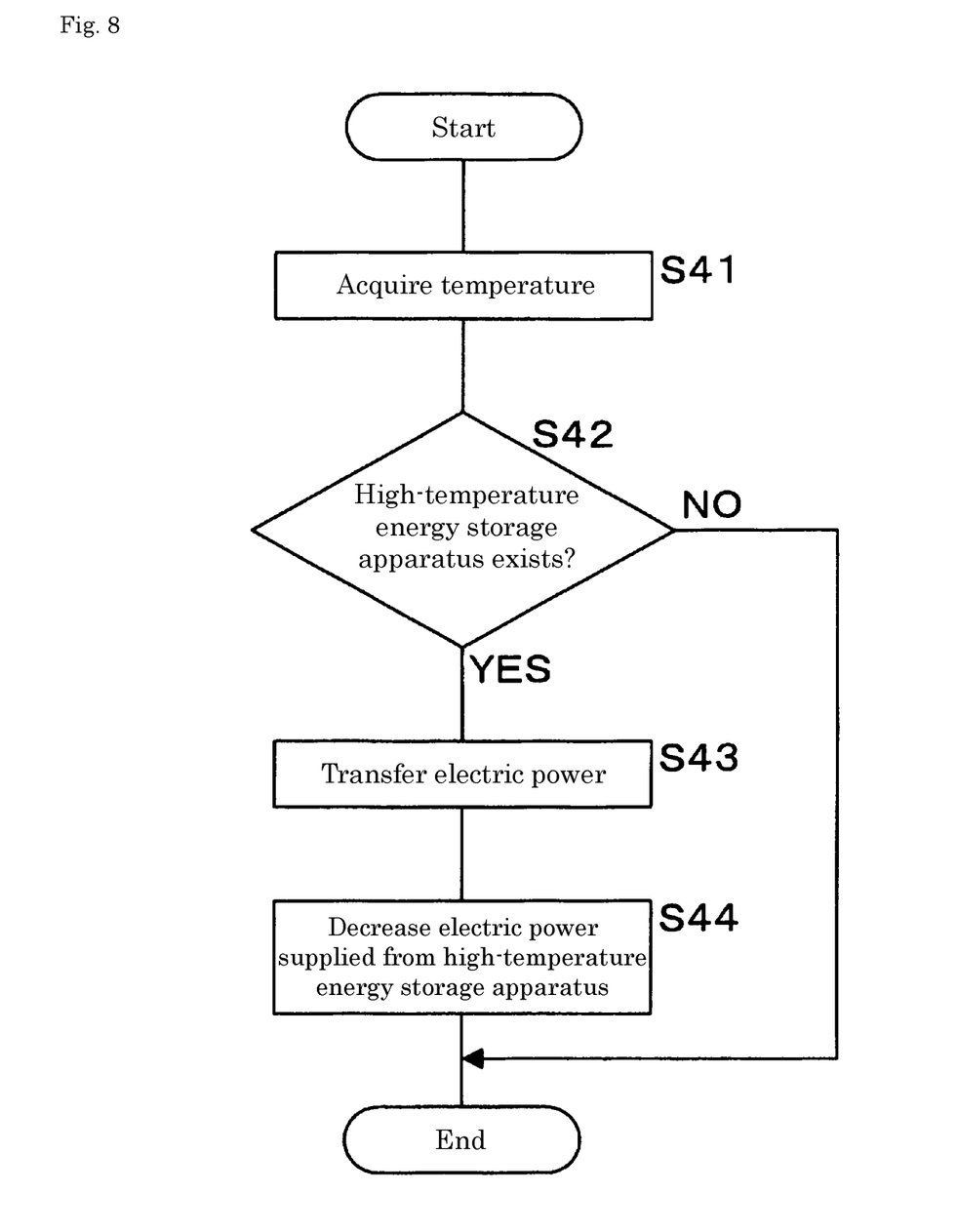
FIG. 8 is a flowchart illustrating a fourth example of the procedure of the processing for transferring the electric power between the plurality of energy storage apparatuses.

FIG. 8 is a flowchart illustrating a fourth example of the procedure of the processing for transferring the electric power between the plurality of energy storage apparatuses. In each BMU 31, the temperature acquisition unit 316 acquires an internal temperature of the energy storage apparatus 11, 12, or 13, and the communication unit 317 transmits information indicating the acquired temperature to the control apparatus 5. The communication unit 54 receives the information indicating the temperature transmitted from the plurality of BMUs 31, so that the control apparatus 5 acquires the internal temperature of each of the energy storage apparatuses 11, 12, and 13 (S41).

The arithmetic unit 51 determines whether the high-temperature energy storage apparatus exists based on the acquired temperature (S42). When the acquired temperature is higher than or equal to a predetermined temperature, the arithmetic unit 51 determines that the high-temperature energy storage apparatus exists. The predetermined temperature is previously stored in the storage 53. Alternatively, the arithmetic unit 51 may determine that the high-temperature energy storage apparatus exists when the acquired temperature exceeds the predetermined temperature. Alternatively, the arithmetic unit 51 may determine that the high-temperature energy storage apparatus exists when a difference between the temperatures of the plurality of energy storage apparatuses is larger than or equal to a predetermined threshold or exceeds the threshold.

When the high-temperature energy storage apparatus does not exist (NO in S42), the arithmetic unit 51 ends the processing. When the high-temperature energy storage apparatus exists (YES in S42), the arithmetic unit 51 performs processing for transferring the electric power from the low-temperature energy storage apparatus to the high-temperature energy storage apparatus (S43). In S43, the arithmetic unit 51 causes the power adjustment unit 55 to operate the power transfer circuit 4 in order to transfer the electric power.

The degradation of the energy storage apparatus easily proceeds as the internal temperature is higher. When the temperature difference between the plurality of energy storage apparatuses exists, the energy storage apparatus having the relatively high temperature is relatively quickly degraded. When the energy storage apparatus 12 is filled with heat, or when a burden of the power supply is high in the energy storage apparatus 12, sometimes the temperature inside the energy storage apparatus 12 becomes high. Because the energy storage apparatus 11 is not connected to the load, the internal temperature tends to be relatively low. When the energy storage apparatus 12 has the high temperature and when the energy storage apparatus 11 has the low temperature, the arithmetic unit 51 causes the power adjustment unit 55 to operate the power transfer circuit 4 so as to transfer the electric power from the energy storage apparatus 11 to the energy storage apparatus 12. As indicated by the solid arrow in FIG. 5, the electric power is transferred from the energy storage apparatus 11 to the energy storage apparatus 12 through the power transfer circuit 4. When the energy storage apparatus 13 has the high temperature, similarly the electric power is transferred from the energy storage apparatus 11 to the energy storage apparatus 13.

The arithmetic unit 51 reduces the electric power supplied from the high-temperature energy storage apparatus to the load (S44). In S44, the arithmetic unit 51 transmits a control signal lowering the electric power from the communication unit 54 to the BMU 31 of the high-temperature energy storage apparatus. In the BMU 31, the communication unit 317 receives the control signal, and the arithmetic unit 311 performs control to reduce the electric power supplied from the energy storage apparatus according to the control signal. For example, the electric power equivalent to the electric power transferred from the low-temperature energy storage apparatus is reduced from the supply power. The electric power transferred from the low-temperature energy storage apparatus is supplied to the load connected to the high-temperature energy storage apparatus.

After S44 is ended, the control apparatus 5 ends the processing. When one energy storage apparatus has the high temperature, the energy storage system 1 transfers the electric power from the low-temperature energy storage apparatus to the high-temperature energy storage apparatus, and reduces the electric power supplied from the high-temperature energy storage apparatus to the load. The electric power transferred from the low-temperature energy storage apparatus is supplied to the load, and the power supply to the load is continued. As a result, the electric power supplied from the high-temperature energy storage apparatus to the load decreases, and the electric power supplied from the low-temperature energy storage apparatus to the load increases.

As the electric power supplied to the load decreases, the burden on the high-temperature energy storage apparatus decreases, and the temperature inside the energy storage apparatus decreases. The difference in temperature between the plurality of energy storage apparatuses becomes small, and the state in which any of the energy storage apparatuses has the high temperature is not maintained. Thus, any of the plurality of energy storage apparatuses is prevented from being relatively quickly degraded.

Figure 9:
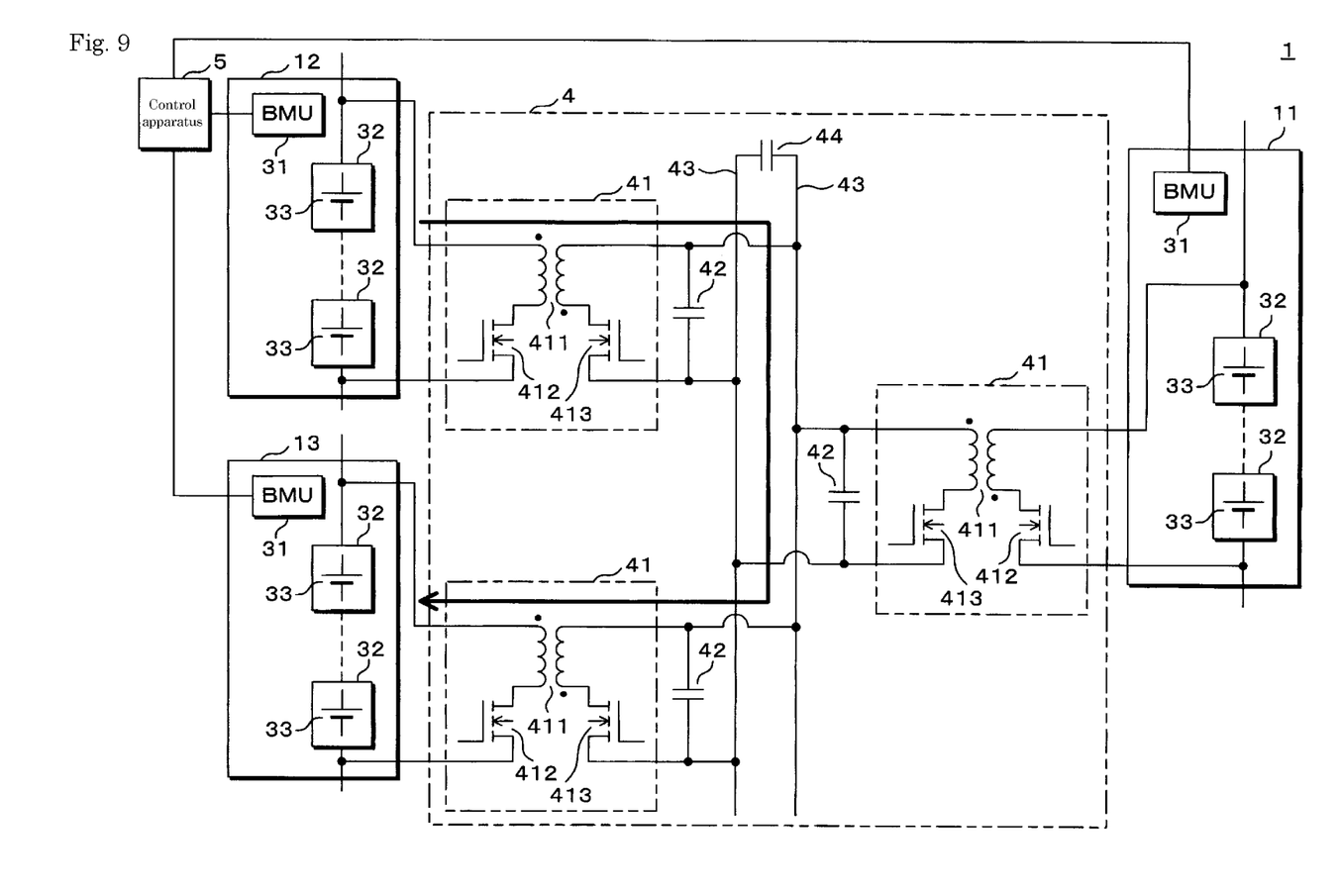
FIG. 9 is a block diagram illustrating a state in which the electric power is transferred in the plurality of energy storage apparatuses connected to a load.

The energy storage system 1 can also transfer the electric power between the plurality of energy storage apparatuses connected to the load. FIG. 9 is a block diagram illustrating a state in which the electric power is transferred in the plurality of energy storage apparatuses 12 and 13 connected to the load. When the discharge voltage of the energy storage apparatus 12 is high while the discharge voltage of the energy storage apparatus 13 is low, when the SOC of the energy storage apparatus 12 is high while the SOC of the energy storage apparatus 13 is low, when the SOH of the energy storage apparatus 12 is high while the SOH of the energy storage apparatus 13 is low, or when the temperature of the energy storage apparatus 12 is low while the temperature of the energy storage apparatus 13 is high, the control apparatus 5 operates the power transfer circuit 4 to transfer the electric power from the energy storage apparatus 12 to the energy storage apparatus 13. The power adjustment unit 55 operates the bidirectional DC-DC converter 41 connected to the energy storage apparatus 12 in order to cause the current to flow from the energy storage apparatus 12 to the relay bus line 43. In addition, the power adjustment unit 55 operates the bidirectional DC-DC converter 41 connected to the energy storage apparatus 13 in order to cause the current to flow from the relay bus line 43 to the energy storage apparatus 13.

As indicated by the solid arrow in FIG. 9, the current flows from the energy storage apparatus 12 to the energy storage apparatus 13 through the power transfer circuit 4, and the electric power is transferred. The energy storage apparatus 13 is charged by the transferred electric power. Alternatively, the transferred electric power is supplied to the load connected to the energy storage apparatus 13. According to the states of the energy storage apparatuses 12 and 13, the energy storage system 1 can also transfer the electric power from the energy storage apparatus 13 to the energy storage apparatus 12.

Figure 10:
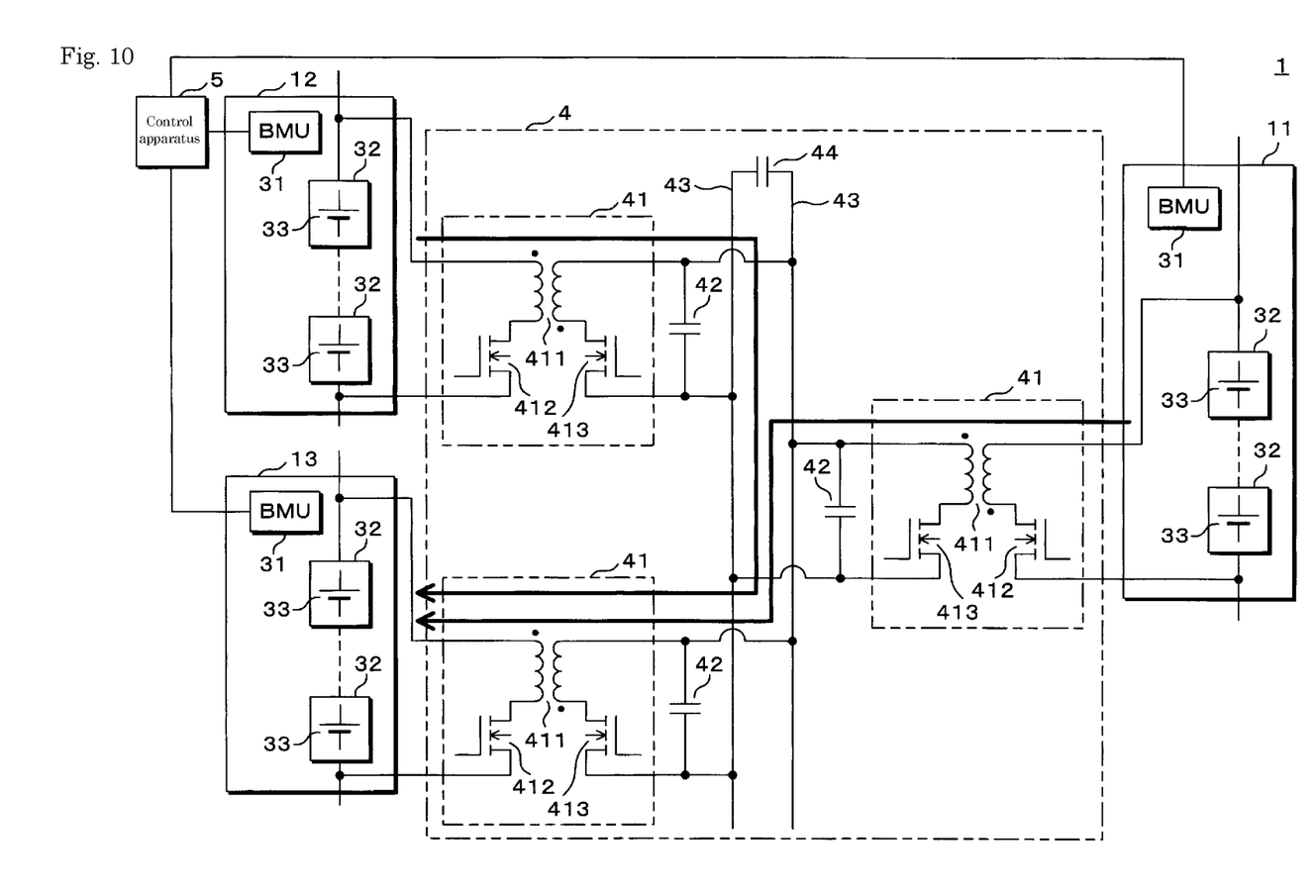
FIG. 10 is a block diagram illustrating a state in which the electric power is transferred from the plurality of energy storage apparatuses to another energy storage apparatus.

The energy storage system 1 can also transfer the electric power from the plurality of energy storage apparatuses to another energy storage apparatus. FIG. 10 is a block diagram illustrating the state in which the electric power is transferred from the plurality of energy storage apparatuses 11 and 12 to another energy storage apparatus 13. When the discharge voltage of the energy storage apparatuses 11 and 12 is high while the discharge voltage of the energy storage apparatus 13 is low, when the SOC of the energy storage apparatuses 11 and 12 is high while the SOC of the energy storage apparatus 13 is low, when the SOH of the energy storage apparatuses 11 and 12 is high while the SOH of the energy storage apparatus 13 is low, or when the temperature of the energy storage apparatuses 11 and 12 is low while the temperature of the energy storage apparatus 13 is high, the electric power can be transferred from the energy storage apparatuses 11 and 12 to the energy storage apparatus 13. The control apparatus 5 operates the power transfer circuit 4 to transfer the electric power from the energy storage apparatuses 11 and 12 to the energy storage apparatus 13.

The power adjustment unit 55 operates the bidirectional DC-DC converter 41 connected to the energy storage apparatus 11 in order to cause the current to flow from the energy storage apparatus 11 to the relay bus line 43. The power adjustment unit 55 operates the bidirectional DC-DC converter 41 connected to the energy storage apparatus 12 in order to cause the current to flow from the energy storage apparatus 12 to the relay bus line 43. In addition, the power adjustment unit 55 operates the bidirectional DC-DC converter 41 connected to the energy storage apparatus 13 in order to cause the current to flow from the relay bus line 43 to the energy storage apparatus 13.

As indicated by the solid arrow in FIG. 10, the current flows from the energy storage apparatuses 11 and 12 to the energy storage apparatus 13 through the power transfer circuit 4, and the electric power is transferred. The energy storage apparatus 13 is charged by the transferred electric power. Alternatively, the transferred electric power is supplied to the load connected to the energy storage apparatus 13. According to the states of the energy storage apparatuses 11, 12, and 13, the energy storage system 1 can also transfer the electric power from the energy storage apparatuses 11 and 13 to the energy storage apparatus 12.

The pieces of processing of S11 to S13, the pieces of processing of S21 to S24, the pieces of processing of S31 to S34, or the pieces of processing of S41 to S44 are repeatedly executed. In this manner, the control apparatus 5 controls the power transfer circuit 4 based on the states of the energy storage apparatuses 11, 12, and 13, and transfers the electric power from another energy storage apparatus to the energy storage apparatus having insufficient power. When the states of the energy storage apparatuses 11, 12, and 13 change, the control apparatus 5 changes the power transfer state. For example, when the state changes from the state where the discharge voltage of the energy storage apparatus 12 is low to the state where the discharge voltage of the energy storage apparatus 13 is low, the control apparatus 5 causes the power transfer circuit 4 to stop the transfer of the electric power from the energy storage apparatus 11 to the energy storage apparatus 12 and start the transfer of the electric power from the energy storage apparatus 11 to the energy storage apparatus 13. The electric power accumulated in the buffer capacitor 44 is discharged and the current flows through the power transfer circuit 4 until the transfer of the electric power is stopped and then the transfer of the electric power is started. The current flowing through the power transfer circuit 4 is not interrupted, and the power transfer state is smoothly changed.

As described above, the energy storage system 1 includes the plurality of energy storage apparatuses, and transfers the electric power between the plurality of energy storage apparatuses. In particular, the electric power is transferred from the reserve energy storage apparatus 11 that does not supply the electric power to the load to the energy storage apparatus to which the load is connected. Even when the electric power to be supplied to the load is insufficient in some energy storage apparatuses, the electric power is transferred from another energy storage apparatus, so that the utilization efficiency of the electric power in the entire energy storage system 1 is improved. Even when the defect is generated in some of the energy storage apparatuses, the electric power is transferred from another energy storage apparatus to continue the power supply to the load, so that reliability of power supply is improved. When the electric power is transferred between the plurality of energy storage apparatuses, the plurality of energy storage apparatuses including the reserve energy storage apparatus 11 are uniformly used, and all the energy storage apparatuses including the reserve energy storage apparatus 11 are effectively used. The unused state is not continued while the energy storage apparatus is charged, and the reliability of the energy storage system 1 is improved. In addition, because the state in which any one of the plurality of energy storage apparatuses has the relatively high temperature does not continue, any one of the energy storage apparatuses is prevented from being degraded relatively quickly to improve the reliability of the entire energy storage system 1. The highly reliable energy storage system 1 is useful as the energy storage system included in the flight vehicle 2 used as the HAPS.

In the embodiment, the mode in which the energy storage system 1 executes the pieces of processing of S11 to S13, the pieces of processing of S21 to S24, the pieces of processing of S31 to S34, and the pieces of processing of S41 to S44 has been described. Alternatively, the energy storage system 1 may be a mode in which at least one of the pieces of processing of S11 to S13, the pieces of processing of S21 to S24, the pieces of processing of S31 to S34, or the pieces of processing of S41 to S44 is executed. For example, in a mode in which the pieces of processing of S11 to S13, the pieces of processing of S21 to S24, or the pieces of processing of S31 to S34 is executed while the pieces of processing of S41 to S44 is not executed, the BMU 31 may not include the temperature acquisition unit 316.

In the embodiment, the energy storage system 1 includes the energy storage apparatuses 11, 12, and 13. Alternatively, the energy storage system 1 may include two energy storage apparatuses. The energy storage system 1 may include at least four energy storage apparatuses. In the embodiment, the energy storage cell 33 is the lithium ion battery. Alternatively, the energy storage cell 33 may be a secondary battery other than the lithium ion battery. In the embodiment, the energy storage apparatuses 11, 12, and 13 are banks each of which includes the plurality of energy storage modules 32. Alternatively, the energy storage apparatuses 11, 12, and 13 may be configured by the single energy storage module 32.

The present invention is not limited to the contents of the above embodiment, but various modifications can be made within the scope of the claims. That is, an embodiment obtained by combining technical means appropriately changed within the scope of the claims is also included in the technical scope of the present invention.

The invention claimed is:
1. An energy storage system used in a flight vehicle, the energy storage system comprising:
a plurality of energy storage apparatuses, each of the energy storage apparatuses being connected to a solar cell and supplied with electric power from the solar cell; and
a power transfer circuit that is connected to the plurality of energy storage apparatuses and transfers electric power between the plurality of energy storage apparatuses,
wherein each of the plurality of energy storage apparatuses includes:
a first energy storage apparatus that does not supply electric power to a load;
a second energy storage apparatus that supplies electric power to a load; and
a third energy storage apparatus that supplies the electric power to an other load different from the load to which the second energy storage apparatus supplies electric power, and
wherein the power transfer circuit includes:
a pair of relay bus lines;

a first bidirectional DC-DC converter connected to the relay bus lines and to the first energy storage apparatus;

a second bidirectional DC-DC converter connected to the relay bus lines and to the second energy storage apparatus; and a third bidirectional DC-DC converter connected to the relay bus lines and to the third energy storage apparatus.

2. The energy storage system according to claim 1, further comprising a control apparatus that controls the power transfer circuit based on states of the plurality of energy storage apparatuses.

3. The energy storage system according to claim 2, wherein the control apparatus causes the power transfer circuit to transfer the electric power from at least one of the plurality of energy storage apparatuses having a low-temperature to at least one of the plurality of energy storage apparatuses having a high-temperature, thereby reducing power supply from the energy storage apparatus having the high temperature to the load and increasing power supply from the energy storage apparatus having the low temperature to the load.

4. The energy storage system according to claim 2, wherein the control apparatus causes the power transfer circuit to transfer the electric power from the energy storage apparatus having a high discharge voltage to the energy storage apparatus having a low discharge voltage.

5. The energy storage system according to claim 2, wherein the control apparatus causes the power transfer circuit to transfer the electric power from the energy storage apparatus having a high state of charge to the energy storage apparatus having a low state of charge.

6. The energy storage system according to claim 2, wherein the control apparatus causes the power transfer circuit to transfer the electric power from the energy storage apparatus having a high state of health to an energy storage apparatus having a low state of health.

7. The energy storage system according to claim 3, wherein the control apparatus causes the power transfer circuit to transfer the electric power from the energy storage apparatus having a high discharge voltage to the energy storage apparatus having a low discharge voltage.

8. The energy storage system according to claim 1, wherein the first energy storage apparatus supplies electric power to at least one of the second energy storage apparatus or the third energy storage apparatus during a period in which the first to third energy storage apparatuses are not supplied with electric power from the solar cell.

9. An energy storage system used in a flight vehicle, the energy storage system comprising:

a plurality of energy storage apparatuses, each of the energy storage apparatuses being connected to a solar cell and supplied with electric power from the solar cell; and a power transfer circuit that is connected to the plurality of energy storage apparatuses and transfers electric power between the plurality of energy storage apparatuses, wherein each of the plurality of energy storage apparatuses includes:
a first energy storage apparatus that does not supply electric power to a load; and
a second energy storage apparatus that supplies electric power to a load, wherein the first energy storage apparatus supplies electric power to the second energy storage apparatus via the power transfer circuit during a period in which the first and second energy storage apparatuses are not supplied with electric power from the solar cell.

10. The energy storage system according to claim 9, wherein, when a discharge voltage of the second energy storage apparatus is less than or equal to a predetermined voltage, the first energy storage apparatus supplies electric power to the second energy storage apparatus.

* * * * *